US008799630B2

(12) United States Patent
McPherson et al.

(10) Patent No.: US 8,799,630 B2
(45) Date of Patent: Aug. 5, 2014

(54) ADVANCED SECURITY NEGOTIATION PROTOCOL

(75) Inventors: Dave M. McPherson, Bothell, WA (US);
Tanmoy Dutta, Sammamish, WA (US);
Cristian Ilac, Sammamish, WA (US);
Liqiang Zhu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1225 days.

(21) Appl. No.: 12/147,054

(22) Filed: Jun. 26, 2008

(65) Prior Publication Data

US 2009/0328140 A1    Dec. 31, 2009

(51) Int. Cl.
*G06F 21/00*    (2013.01)
(52) U.S. Cl.
USPC .................... 713/1; 713/2; 713/100; 713/151
(58) Field of Classification Search
USPC ......................................... 713/151, 1, 2, 100
See application file for complete search history.

(56) References Cited

U.S. PATENT DOCUMENTS

| | | | |
|---|---|---|---|
| 6,240,513 B1 | 5/2001 | Friedman et al. | |
| 6,636,898 B1 | 10/2003 | Ludovici et al. | |
| 7,120,930 B2 | 10/2006 | Maufer et al. | |
| 7,143,154 B2 | 11/2006 | Bagasrawala | |
| 7,421,503 B1 * | 9/2008 | Stieglitz et al. | 709/229 |
| 7,761,468 B2 * | 7/2010 | Gao et al. | 707/781 |
| 2002/0156906 A1 * | 10/2002 | Kadyk et al. | 709/229 |
| 2004/0088567 A1 | 5/2004 | Lamotte | |
| 2004/0167984 A1 * | 8/2004 | Herrmann | 709/229 |
| 2005/0108531 A1 * | 5/2005 | Swander et al. | 713/171 |
| 2005/0246716 A1 * | 11/2005 | Smith et al. | 719/315 |
| 2006/0288404 A1 | 12/2006 | Kirshnan et al. | |
| 2007/0005801 A1 | 1/2007 | Kumar et al. | |
| 2007/0022475 A1 | 1/2007 | Rossi et al. | |
| 2007/0101159 A1 | 5/2007 | Zhang et al. | |
| 2007/0101406 A1 * | 5/2007 | Zavalkovsky et al. | 726/4 |
| 2007/0277231 A1 * | 11/2007 | Medvinsky et al. | 726/5 |
| 2009/0193247 A1 * | 7/2009 | Kiester et al. | 713/151 |

OTHER PUBLICATIONS

"Making Login Services Independent of Authentication Technologies" http://www.unix-edu.se/share/security/auth/pam_external.pdf.*
L. Zhu et al. "RFC 4178: The Simple and Protected Generic Security Service Application Program Interface (GSS-API) Negotiation Mechanism" © 2005 The Internet Society (22 pages) http://www.rfc-editor.org/rfc/pdfrfc/rfc4178.txt.pdf.*
L. Blunk et al. "RFC 2284: PPP Extensible Authentication Protocol (EAP)" © 1998 The Internet Society (15 pages) http://www.rfc-editor.org/rfc/pdfrfc/rfc2284.txt.pdf.*

(Continued)

*Primary Examiner* — Darren B Schwartz
*Assistant Examiner* — Thomas Gyorfi
(74) *Attorney, Agent, or Firm* — Tony H. Azure; Andrew Sanders; Micky Minhas

(57) ABSTRACT

This disclosure describes methods, systems and application programming interfaces for creating an advanced security negotiation package. This disclosure describes creating an advanced security negotiation protocol under a Simple and Protected Negotiation Mechanism (SPNEGO) protocol to negotiate an authentication scheme. The protocol describes defining a Windows Security Type (WST) Library message to protect negotiation data during the advanced security negotiation protocol. The protocol sends an initial message that carries multiple authentication messages to reduce redundant roundtrips and implements key exchanges by a mini Security Support Provider (SSP).

19 Claims, 5 Drawing Sheets

(56) References Cited

OTHER PUBLICATIONS

"What is GUID?—A Word definition from the Webopedia Computer Dictionary" Article from Mar. 6, 2005 as verified by the Internet Archive (2 pages) http://web.archive.org/web/20050306012446/http://www.webopedia.com/TERM/G/GUID.html.*

B. Aboba et al. "RFC 2716: PPP EAP TLS Authentication Protocol" © 1999 The Internet Society (24 pages) http://www.rfc-editor.org/rfc/pdfrfc/rfc2716.txt.pdf.*

T. Dierks et al. "RFC 2246: The TLS Protocol Version 1.0" © 1999 The Internet Society (80 pages) http://www.rfc-editor.org/rfc/pdfrfc/rfc2246.txt.pdf.*

Schneier, Bruce. "Applied Cryptography, $2^{nd}$ Edition" © 1996 Bruce Schneier, published by John Wiley & Sons Inc. (pp. 185-187 and 574-577).*

"Security Protocols" © 2007 Microsoft (article dated Nov. 18, 2006 by Google) (47 pages) http://web.archive.org/web/20090327024517/http://msdn.microsoft.com/en-us/library/aa738565.aspx.*

IT Practice SPNEGO Authenticator Module, retrieved at <<http://www.it-practice.dk/dk/file/102.1021/whitepaper_spnego_sso.pdf>>, IT Practice, Aug. 27, 2004, pp. 1-9.

Surati, et al., HTTP-Based Cross-Platform Authentication via the Negotiate Protocol, retrieved on Apr. 28, 2008 at <<http://msdn2.microsoft.com/en-us/library/ms995330(printer).aspx, Microsoft Corporation, Dec. 2002, pp. 1-9.

Zhu, et al., The Simple and Protected Generic Security Service Application Program Interface (GSS-API) Negotiation Mechanism, retrieved on Apr. 28, 2008 at <<http://tools.ietf.org/html/rfc4178>>, The Internet Society, Oct. 2005, pp. 1-22.

* cited by examiner

ADVANCED SECURITY NEGOTIATION PROTOCOL

TECHNICAL FIELD

The subject matter relates generally to a security negotiation mechanism, and more specifically, providing a negotiation protocol to negotiate an authentication scheme under SPNEGO.

BACKGROUND

There are many negotiation mechanisms available when a client wants to authenticate to a remote server. One negotiation mechanism that is typically known is a Simple and Protected Negotiation Mechanism (SPNEGO).

SPNEGO has many existing problems. One problem is that SPNEGO negotiates a common mechanism during a first round of negotiation. If this negotiated mechanism does not work and the client determines it does not have the necessary credentials based on a server policy, the client can not attempt a different security package. Thus, SPNEGO does not allow renegotiation after a first failed roundtrip. Another problem is that SPNEGO does not provide support for auxiliary data to be provided in the negotiation. Such auxiliary data can be useful or even required when the configuration information, such as the trust anchors on both the client and the server are needed to determine if a particular security mechanism can authenticate the client and the server.

Although SPNEGO provides a common negotiation mechanism, there is room for improvement. It is desirable to find ways to improve upon these problems and other deficiencies.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes various exemplary systems, methods, and computer program products for providing an advanced security negotiation package under a Simple and Protected Negotiation Mechanism (SPNEGO) mechanism. The disclosure describes creating an advanced security negotiation protocol to negotiate an authentication scheme. Furthermore, the protocol describes sending an initial message that carries multiple authentication messages to reduce redundant roundtrips.

This advanced security negotiation package maintains backward compatibility and reduces the operation costs when being deployed and configured for today's technological environment. Furthermore, there is improved efficiency and convenience of minimizing a number of context establishment tokens by using the advanced security negotiation package between a client and a server. Thus, security is improved and user experience is enhanced.

BRIEF DESCRIPTION OF THE DRAWINGS

The Detailed Description is set forth with reference to the accompanying figures. The teachings are described with reference to the accompanying figures. In the figures, the leftmost digit(s) of a reference number identifies the figure in which the reference number first appears. The use of the same reference numbers in different figures indicates similar or identical items.

Many specific details of certain implementations of the subject matter are set forth in the following description and in FIGS. 1-5 to provide a thorough understanding of such implementations. One skilled in the art will understand, however, that the subject matter may have additional implementations, or that the subject matter may be practiced without several of the details described in the following description.

DETAILED DESCRIPTION

Overview

This disclosure is directed to various exemplary methods, computer program products, and systems for an advanced security negotiation package. The package describes providing an advanced security negotiation protocol under a Simple and Protected Negotiation Mechanism (SPNEGO) mechanism. The package uses the advanced security negotiation protocol to negotiate an authentication scheme. Furthermore, the package defines a Windows Security Type (WST) Library message, the message is used to protect negotiation data, the WST message includes a fixed length header and a variable length payload. The package sends an initial message that carries multiple authentication messages to reduce redundant roundtrips, and implements key exchanges by a Security Support Provider (SSP).

This disclosure also describes a client and a server supporting the advanced security negotiation package and/or protocol in order for the advanced security negotiation package and/or protocol to negotiate the authentication scheme. Benefits of the advanced security negotiation package include backward compatibility for applications running on a Windows system, minimal management number of context establishment tokens and thus reduced cost of protocol negotiation. For example, the advanced security negotiation package allows automatic updating.

The advanced security negotiation package described herein are not limited to any particular application, but may be applied to many contexts and environments. By way of example and not limitation, the advanced security negotiation package may be employed in Office Live, Rich-Client federation, client software applications such as Word, Excel, Visio; server applications such as SharePoint, Exchange; and Windows web-based networking interfaces such as Winlnet, WebDAV, WinHttp; RPC; and the like.

Exemplary Advanced Security Negotiation Environment

The following discussion of an exemplary operating environment provides the reader with assistance in understanding ways in which various subject matter aspects of the system, methods, and computer program products may be employed. The environment described below constitutes an example and is not intended to limit application of the subject matter to any one particular operating environment.

Figure 1:
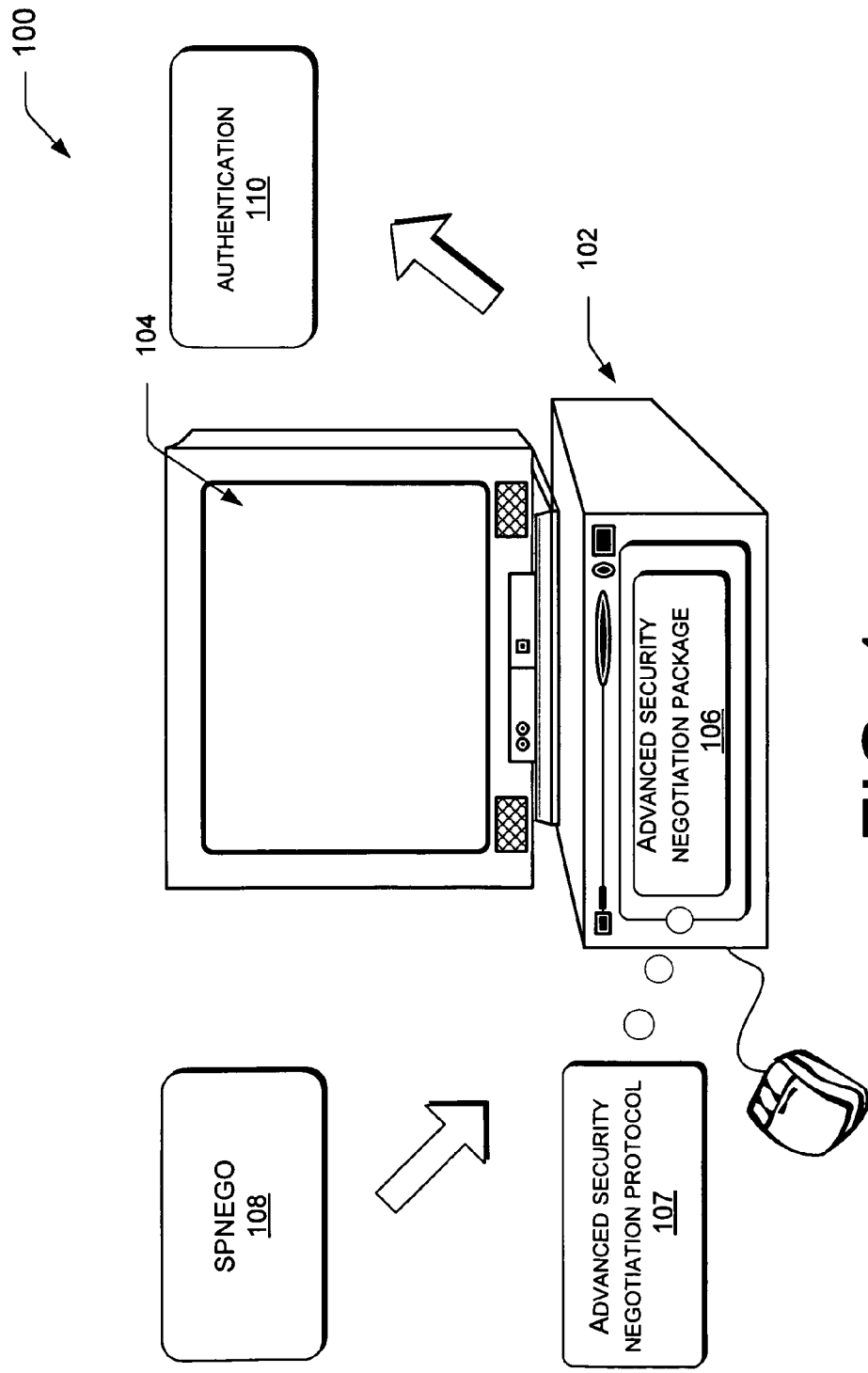
FIG. 1 is a block diagram of an exemplary environment for an advanced security negotiation package under SPNEGO.

FIG. 1 is an overview block diagram of an exemplary environment 100 for an advanced security negotiation package and protocol. Shown is a computing device 102. Computing devices 102 that are suitable for use with the environment 100, include, but are not limited to, a personal computer, a laptop computer, a desktop computer, a workstation computer, a personal digital assistance, a cellular phone, a writing tablet, and the like. These various types of computing devices 102 enable a user to conduct an activity, such as negotiating a security protocol, authenticating the computing device 102, running applications, accessing files, managing databases, retrieving email, using a calendar, using network resources, sharing folders, and the like. The computing device 102 may include a monitor 104 to display services, as well as other applications.

The environment 100 may include an advanced security negotiation package including but not limited to, a tool, a method, a solver, software, an application program, a service, technology resources which include access to the internet, and the like. Here, the advanced security negotiation package is implemented as an application program 106.

The advanced security negotiation application program 106 selects a negotiation mechanism and establishes security context. Then, the process performs an authentication or an encryption scheme. The advanced security negotiation application program 106 is a security package that creates a security protocol 107 extended under a negotiation mechanism, known as a Simple and Protected Negotiation Mechanism SPNEGO 108. SPNEGO 108 invokes security context establishment if there is a common security mechanism between a client and a server.

This advanced security negotiation protocol 107 can protect any negotiation information between the client and the server. This protection occurs when the underlying mechanism selected is capable of integrity protection. The term "advanced security negotiation package" is used interchangeably with the terms "advanced security negotiation protocol" and "advanced security negotiation application program". The advanced security negotiation application program 106 is operational when a client application attempts to authenticate to a remote server without knowing a priori what authentication protocols the other supports. The advanced security negotiation package application program 106 operates under the SPNEGO 108 mechanism and Windows® Server. Once the negotiation protocols are selected and identified by the client and the server, the advanced security negotiation protocol 107 is used as an authentication 110 mechanism between the client and the server.

The advanced security negotiation protocol 107 offers an advantage by allowing auxiliary data to be used in negotiating the protocol. This auxiliary data is known as Authentication Metadata in web services security language, which may contain information in helping a user perform the authentication. A benefit of the advanced security negotiation protocol 107 allows renegotiation after a first roundtrip. For example, the renegotiation facility can be used to select a subsequent authentication mechanism in cases when selection agreement was possible not in the first roundtrip.

Exemplary Flowchart for Advanced Security Negotiation Protocol

Figure 2:
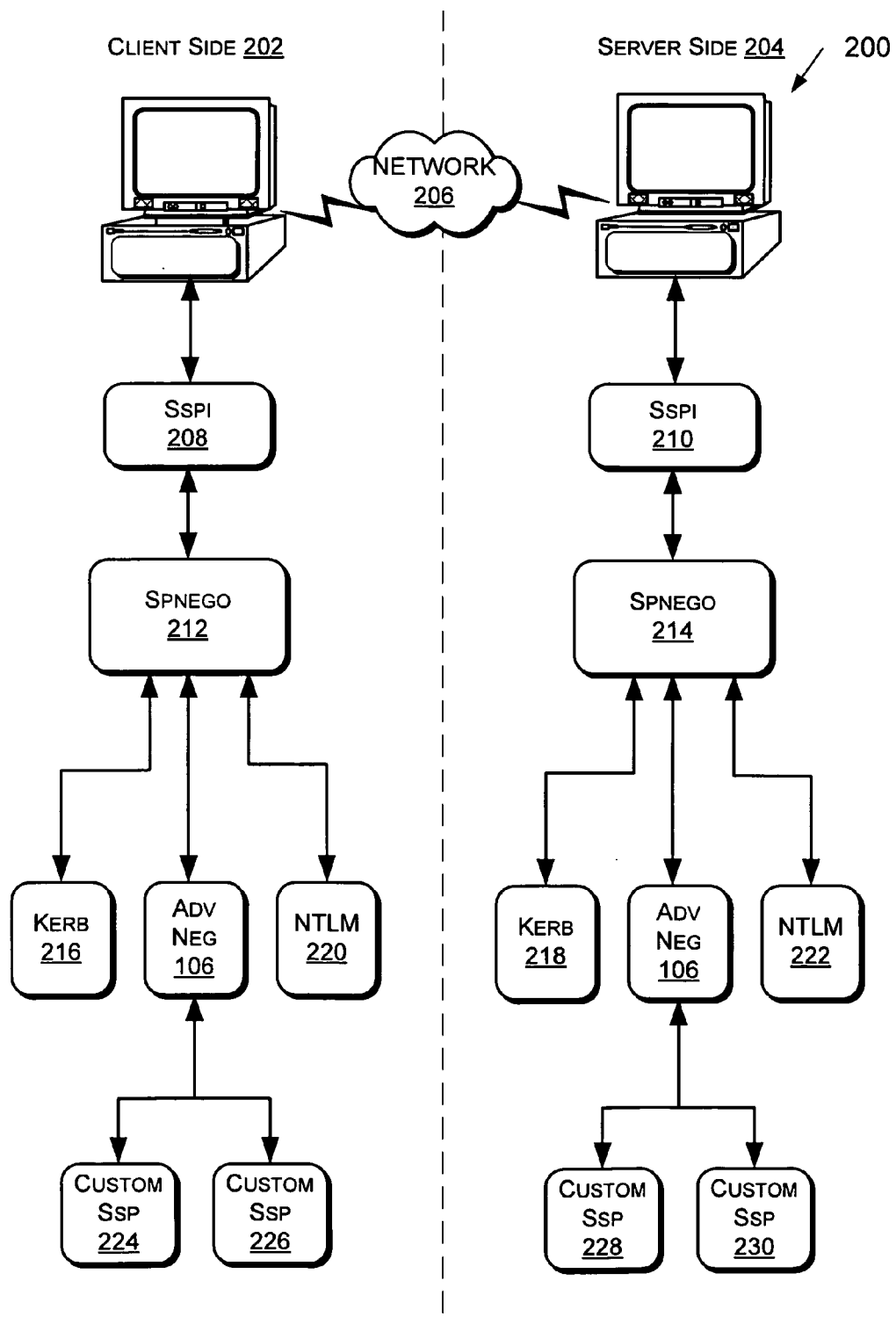
FIG. 2 is a block diagram of the exemplary advanced security negotiation package according to one implementation.

FIG. 2 illustrates an overview of an exemplary flowchart for the advanced security negotiation package 106 and protocol 107. For ease of understanding, the method 200 is delineated as separate steps. However, these separately delineated steps should not be construed as necessarily order dependent in their performance. The order in which the process is described is not intended to be construed as a limitation, and any number of the described process blocks may be combined in any order to implement the method, or an alternate method. Moreover, it is also possible that one or more of the provided steps may be omitted.

Illustrated in FIG. 2 is an exemplary system 200 configured to negotiate the protocol negotiation session between a client computing device 202 and the server 204 over a network 206. The system 200 illustrates architecture of some components on a client side 202 and a server side 204. Alternatively, these components may reside in multiple other locations. For instance, all of the components of FIG. 2 may exist on the client side 202 or the server side 204. Furthermore, two or more of the illustrated components may combine to form a single component at a single location.

The client side 202 includes the client computing device to access services, resources, and applications on the system 200. The advanced security negotiation package 106 is available to a user via a Security Support Provider Interface (SSPI) 208 infrastructure of an operating system of the client side 202. The client operating system includes but is not limited to, Windows Server System™, Windows Server® Longhorn, Windows Vista™, Windows®7, and the like.

The server side 204 also includes similar components to the client side 202. For ease of understanding, the components identified first by the reference number are ones associated with the client, followed by the reference number for the components associated with the server side 204.

The SSPI 208, 210 authenticates the user by verifying user identification, name and password, and the like. The client 202 and the server 204 transmit information back and forth until SSPI 208, 210 are satisfied with the process. More details follow in FIGS. 3 and 4 regarding a client first protocol and a server first protocol, respectively.

Referring back to FIG. 2, are components that are similar on the client side 202 and the server side 204. Shown is SPNEGO 212, 214, the negotiation protocol between the client 202 and the server 204 to negotiate an authentication protocol. Here, the client 202 and the server 204 may propose an authentication package or exchange a list of authentication packages that each supports and accept the authentication package or choose one from the list of authentication packages. In some instances, the authentication package may be rejected.

In this implementation, Windows supports three primary SSPs for SPNEGO 212, 214 to handle negotiations as part of the process. The authentication packages shown are Kerberos 216, 218, the advanced security negotiation package 106, and Windows NT Lan Manager (NTLM) 220, 222. People skilled in the art are familiar with Kerberos 216, 218 and NTLM 220, 222 authentication packages. For example, Kerberos 216, 218 tends to be a default authentication for a service in the computer network and NTLM 220, 222 is an authentication protocol used in various Microsoft network implementations. These two authentication packages are viewed as negotiable sub-mechanisms of SPNEGO 212, 214 and may use an Active Directory.

The third authentication package is the advanced security negotiation package 106, which enables enhanced negotiation capabilities. The client 202 and the server 204 should support the advanced negotiation package 106 in order for negotiation to be handled by the advanced security negotiation package 106 on behalf of SPNEGO 212, 214. If the negotiation selected is the advanced security negotiation package 106, the process may also include custom SSPs 224, 226, 228, 230. These custom SSPs are to provide implementation and integration of additional protocols for other applications.

The advanced security negotiation package 106 may be implemented as an SSP known as V5-SPMI SSP. The advanced security negotiation package 106 supports a standard SPMI interface and may be able to negotiate a SSP that supports a V5 SPMI interfaces. The V5 SPMI interfaces add more operations (functions) that these SSPs need to implement. An object identifier (OID) of the advanced security negotiation package 106 is 1.3.6.1.4.1.311.2.2.30. The OID is allocated in a Microsoft specific OID arc. One more change that the advanced security negotiation package 106 brings is that instead of OIDs, Global Unique Identifiers (GUID) are used to identify authentication packages. This is done to simplify the message processing and complexity associated with variable length OIDs. Furthermore, the dependency of OID processing on ASN for encoding and decoding is also removed. Thus, the security package that can be negotiated with the advanced security negotiation package 106 is known as Auth Scheme.

Since some legacy SSPs are anointed with OIDs, a mapping from the GUIDs to OIDs is necessary. If the Auth Scheme's GUID is x and this Auth Scheme does not already have an OID otherwise assigned, the object identifier for this Auth Scheme is 1.3.6.1.4.1.311.2.2.30.x.

In an implementation, Live and a third party SSP may each have own trust roots and certificate verification. These items may be part of the authentication protocol implemented by the authentication packages and may refer to the respective trust roots. As part of the negotiation, the trust roots may be sent between the client and the server and the appropriate package chosen based on whichever one is supported in both machines. In this implementation, both machines support both, the package may be chosen in an order of choice by the user.

To avoid redundant roundtrips, the authentication metadata blobs from each SSP may be sent together, alongside the list of supported authentication packages in the initial round trip of the advanced security negotiation protocol 107. Since this authentication metadata may be part of the initial exchange, the prescriptive guidance for such SSP writers is to be conscious to not produce a large chunk of data. Another prescriptive guidance may be that SSPs should not attempt to perform expensive key exchanges during the authentication metadata exchange. Any context establishment tokens should instead be encapsulated in the AP_REQUEST and CHALLENGE messages. There may be at most one AP_REQUEST/CHALLENGE message per SSPI token but there can be multiple authentication metadata messages.

A basic unit of the advanced security negotiation protocol 107 message is a Windows Security Type Library (WST) message. The WST message consists of a fixed length header and the variable length payload. A variable length field in the protocol message is described with the length and the payload offset in the message. Any offset field in the message contains an offset of the payload starting from the beginning of the structure header through the WST message.

The WST message contains the length of the header and the length of the whole WST message. The self-describing property of WST messages provides framing when there are multiple WST messages in input or output SSPI tokens of InitializeSecurityContext or AcceptSecurityContext.

The WST messages for establishing a security context is called a conversation. A conversation is identified using the ConversationID in the message independent header. The ConversationID in the WST messages in a particular conversation is the same and is introduced in order to identify the messages that are part of the same negotiation.

Exemplary Client-First Advanced Security Negotiation Protocol

Figure 3:
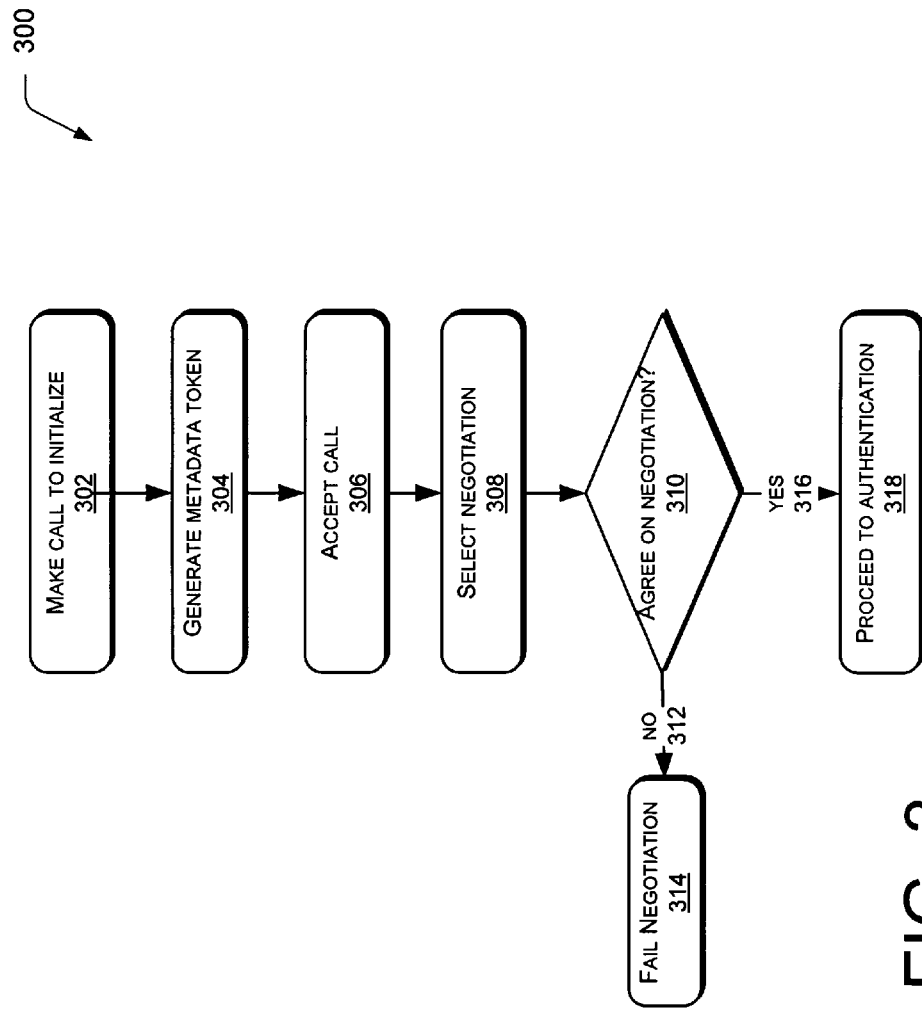
FIG. 3 is an overview of an exemplary flowchart for an advanced security negotiation protocol according to a client first implementation.
Figure 4:
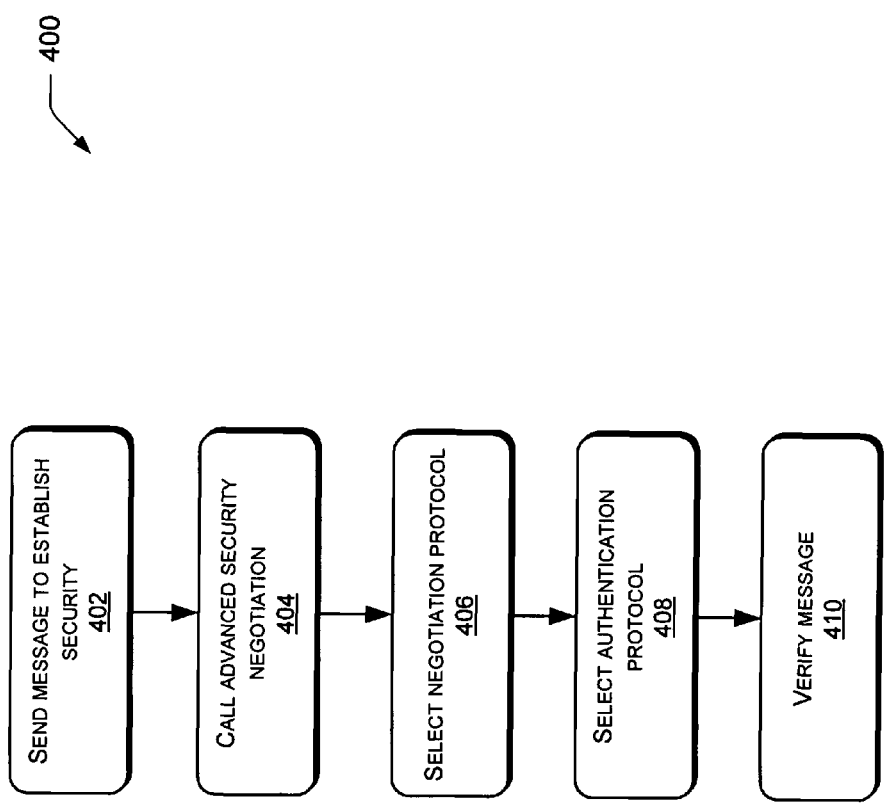
FIG. 4 is a block diagram of an exemplary process for an advanced security negotiation protocol according to a server first implementation.

FIGS. 3 and 4 illustrate exemplary manner of operations of protocols for the architecture of FIG. 2. FIG. 3 illustrates an exemplary protocol for a client-first advanced security negotiation protocol 300 and FIG. 4 illustrates an exemplary server-first advanced security negotiation protocol 400.

FIG. 3 is a block diagram of the client-first advanced security negotiation protocol 300. Block 302 illustrates the client sends a first message by making a first call to start the process. The client application starts the context negotiation by calling InitializeSecurityContext (ISC) without an input token, while an output token starts as a CLIENT-HELLO message. A CLIENT-HELLO message is a WST_HELLO_MESSAGE of the WST_MESSAGE_TYPE_CLIENT_HELLO message type. An example of this message in a C/C++ description is:

```
typedef struct _WST_HELLO_MESSAGE
{
    WST_MESSAGE_HEADER Header;
        // WST_MESSAGE_TYPE_CLIENT_HELLO for the client,
        // WST_MESSAGE_TYPE_SERVER_HELLO for the server
    UCHAR Random[WST_HELLO_RANDOM_LEN];
    WST_AUTH_SCHEME_VECTOR AuthSchemes;
    WST_EXTENSION_VECTOR Extensions;
} WST_HELLO_MESSAGE, *PWST_HELLO_MESSAGE;
```

The client generates a unique conversation ID and fills a common header. The ConversationID in subsequent messages should remain the same. The client also fills a Random field using a secure random number generator and fills AuthScheme with available authentication packages supported by the client in decreasing preference order. The WST_AUTH_SCHEME type is an alias for GUID.

There is an extension field in the advanced security negotiation package 106, which contains extensions for future extensibility. The extension field was introduced as a placeholder to plug in data in a forward compatible way. That data, can, for example, be used to implement fast reconnects. The interpretation of this data is specific to the type of the extension and is described as below.

```
typedef struct _WST_EXCHANGE_MESSAGE
{
    WST_MESSAGE_HEADER Header; //
WST_MESSAGE_TYPE_CHALLENGE for
            // the server, or WST_MESSAGE_TYPE_AP_REQUEST
for the client
    WST_AUTH_SCHEME AuthScheme;
    WST_BYTE_VECTOR Exchange; // contains the opaque handshake
message
            // for the authentication scheme
} WST_EXCHANGE_MESSAGE,
*PWST_EXCHANGE_MESSAGE;
```

All negative extension types (the highest bit is set to 1) are unfavorable. If the receiver does not understand a critical extension, the authentication should be rejected.

At block 304, the process 300 generates an authentication metadata token for each supported scheme by the client. The client authentication metadata token should be encapsulated in an EXCHANGE message with the message type WST_MESSAGE_TYPE_CLIENT_META_DATA. Metadata means several things depending on the type of application. For example, metadata may mean implementation of an authentication package to use certificate trust-roots as metadata that may identify the implementation of an authentication package to be used in an application scenario. In other scenarios, the site-ID may act as metadata in Office Live and the claim types the server supports may act as metadata in federation case of Windows.

Both an AP_REQUEST message and a CLIENT_META_DATA message are instances of the WST_EXCHANGE_MESSAGE structure with different message type values. An AP_REQUEST message contains the type WST_MESSAGE_TYPE_AP_REQUEST while a META_DATA message contains the type WST_MESSAGE_TYPE_CLIENT_META_DATA. An example is shown below:

```
typedef struct _WST_EXCHANGE_MESSAGE
{
    // WST_MESSAGE_TYPE_CHALLENGE for server for server
    // WST_MESSAGE_TYPE_AP_REQUEST for the client
    // WST_MESSAGE_TYPE_CLIENT_META_DATA for
    client metadata
    // WST_MESSAGE_TYPE_SERVER_META_DATA for
    server metadata
    WST_MESSAGE_HEADER Header;
    // Auth scheme GUID
    WST_AUTH_SCHEME AuthScheme;
    // Opaque handshake message for the auth scheme
    WST_BYTE_VECTOR Exchange;
} WST_EXCHANGE_MESSAGE, *PWST_EXCHANGE_MESSAGE;
```

The AuthScheme field signifies the authentication scheme for which the EXCHANGE message is targeted. If the authentication scheme fails to produce the authentication metadata token, the authentication scheme should be removed from a list of supported authentication schemes. The client can terminate the negotiation if the failure to acquire the initial authentication token implies an inability to authenticate in a secure fashion.

If there are more than one exchange messages, the order in which the exchange message is included bears no significance. In other words, the exchange messages are in an unordered set. The client may determine to terminate the authentication exchange to protect the client.

At block 306, the server calls AcceptSecurityContext( ), which may be added as part of a typical SSPI exchange, with the CLIENT_HELLO message sent by the client as the input token. The CLIENT_NEGO message may be optionally followed by a set of CLIENT_META_DATA messages as described above, in which case all the WST messages concatenated by the client are taken as a single input token.

The server verifies the CLIENT-NEGO message to make sure the message is well-formed. The server then examines the set of authentication schemes supported by the client and computes the list of authentication schemes mutually supported by the client and the server. The server should examine the extensions in the CLIENT-HELLO message and reject any authentication with an unknown critical extension.

Block 308 illustrates selecting a negotiation protocol. Here, the output token starts as a SERVER-HELLO message. The SERVER-HELLO message is a WST_HELLO_MESSAGE structure of the WST_MESSAGE_TYPE_SERVER_HELLO message type. The AuthScheme field contains the set of mutually supported auth schemes. There is no extension in the HELLO message defined for the server, but reserved for future extensibility. The authentication schemes are sent in the decreasing preference order of the server. The server does not need to honor the preference order chosen by the client.

The first authentication scheme in the SERVER-HELLO message is the authentication scheme selected by the server. This is also known as the negotiated authentication scheme.

If the auth scheme selected by the server can return an authentication metadata token (that contains server policy), the server's authentication metadata should be encapsulated in a SERVER_META_DATA message, and should be included in the output token of the initial call to AcceptSecurityContext, and the meta data tokens are included in a returned output SSPI token.

If the auth scheme selected by the server requires a server-challenge, the server challenge should be encapsulated in a CHALLENGE message, and should be included in the output token of AcceptSecurityContext( ), this challenge message should immediately follow the SERVER-HELLO message in order to optimize away a roundtrip. However, the advanced security negotiation protocol 107 allows for the authentication negotiation to span multiple roundtrips.

A CHALLENGE message is a WST_EXCHANGE_MESSAGE structure of the message type WST_MESSAGE_TYPE_CHALLENGE. The AuthScheme field in the WST_EXCHANGE_MESSAGE structure signifies for which authentication scheme the server side challenge is targeted.

If the client included an AP-REQUEST message and the AP-REQUEST message is for a mutually supported scheme, the AP-REQUEST should be processed by the server or saved for future use. If the AP-REQUEST message for the negotiated authentication scheme is processed by the server and the authentication produces a response, the response should be encapsulated in a CHALLENGE message. There is at most one CHALLENGE message in the server response.

Both the client and the server can choose another authentication scheme at any time during the negotiation. If an authentication scheme was used and another authentication scheme is selected, the previous authentication scheme may not be selected again in this conversation. If the client included the AP-REQUEST for the authentication scheme in the initial SSPI token and chooses to select that auth scheme, the client should send an alert type message signifying that auth scheme. This is to allow the server to continue the handshake by picking up the initial AP-REQUEST message sent in the initial SSPI context token for this authentication scheme. The negotiation may eventually terminate when there is no more authentication schemes left from the mutually-supported set.

At block 310 there is a decision point on whether there is an agreement on the advanced security negotiation package 106. If there is no agreement as shown by 312, the process proceeds to block 314 indicating a failed negotiation.

If there is an agreement between the client and the server on the advanced security negotiation package 106, the process travels to yes shown by 316.

The client then calls InitializeSecurityContext( ), which may be added as a part of a typical SSPI exchange, with the SERVER-HELLO message as the input token (note that the input token may contains one CHALLENGE messages as described above in addition to the SERVER-HELLO message). If the server includes a CHALLENGE message for the negotiated authentication scheme, the CHALLENGE message should be processed by the client. Otherwise, the client picks one authentication scheme from the list of mutually supported authentication schemes in the server hello message, and replies with a handshake message of the selected authentication scheme. The handshake message in the reply should be encapsulated in an AP-EXCHANGE message.

Whenever there is a key available for either the client or the server, a VERIFY message is produced and included in the output token. The authentication schemes managed by the advanced security negotiation package 106 should support RFC3961 by producing a protocol key based on RFC3961. That protocol key is used as the base key in the parlance of RFC3961 to sign the WST messages in the conversation.

A VERIFY message is a WST_VERIFY_MESSAGE structure. The AuthScheme field signifies from which authentication scheme the protocol key was obtained. An example is shown below.

```
typedef struct _WST_VERIFY_MESSAGE
{
    WST_MESSAGE_HEADER Header; // WST_MESSAGE_TYPE_VERIFY
    WST_AUTH_SCHEME AuthScheme;
    WST_CHECKSUM Checksum; // contains the checksum of all the
        // previously exchanged WST messages in the order they
        // were sent in the conversation
} WST_VERIFY_MESSAGE, *PWST_VERIFY_MESSAGE;
```

The WST verify message protects negotiation data, prevents downgrade and ensures mutually preferred packages are selected. Thus, both the client and the server should send a VERIFY message and receive a verify message in order for the advanced security negotiation package 106 to complete the negotiation.

From there the process proceeds to authentication 318. In some implementations, the server determines whether to terminate the authentication exchange in order to protect the server or the client.

The authentication schemes managed by the advanced security negotiation package 106 should support RFC3961 by producing a protocol key based on RFC3961. That protocol key is used as the base key in the parlance of RFC3961 to sign the WST messages in the conversation.

Exemplary Server-First Advanced Security Negotiation Protocol

FIG. 4 illustrates an exemplary server-first advanced security negotiation protocol 400. FIG. 4 is a block diagram where the server sends the first message to establish a security context. This may occur in context of SMB and HTTP protocols. The server-first protocol 400 is very similar to the client-first protocol 300 described in the previous section. Consequently the protocol description here is abbreviated based on the Client-First protocol 300.

In block 402, the server makes the first call to AcceptSecurityContext( ) with no input token, and the output token starts as a WST message type. If the authentication scheme supported by the server requires a server-challenge token, the authentication scheme should be included in the initial context token from the server (the output token of AcceptSecurityContext( ). A server challenge message should be encapsulated in a CHALLENGE message. There can be one CHALLENGE message per authentication scheme in the initial context token.

Block 404 illustrates the client then calls AcceptSecurityContext( ) with the WST message as the input token (note that in the input token the SERVER-HELLO message may be followed by a list of CHALLENGE messages as described above, in which case the WST messages concatenated by the server are taken as a single input token). If there is an unknown critical extension in the SERVER-HELLO message, the authentication should be rejected.

The output token starts as a CLIENT-HELLO message. The client does not need to honor the preference order chosen by the server. The first authentication scheme in the CLIENT-HELLO message is the negotiated authentication scheme. If the negotiated authentication scheme sends AP-EXCHANGE handshake message, the handshake message should be encapsulated in a AP-REQUEST message, and should be included in the output token of InitializeSecurityContext( ).

There is at most one AP-REQUEST message in the client response. The client determines whether to terminate the authentication exchange in order to protect the server or the client.

Block 406 shows the server then calls InitializeSecurityContext( ) with the CLIENT-HELLO message as the input token (note that the input token may contain one AP-REQUEST messages as described above, in which case the two WST messages concatenated by the client are taken as a single input token).

If the client included an AP-REQUEST message for the negotiated authentication scheme, that AP-REQUEST message should be processed. Otherwise the server can pick one authentication scheme from the list of mutually supported authentication schemes in the client hello message, and replies with a handshake message of the selected authentication scheme. The handshake message in the reply should be encapsulated in an AP-EXCHANGE message.

Block 408 shows selecting an authentication protocol. The client and the server can proceed to exchange handshake messages as determined by the chosen authentication scheme. Both the client and the server can choose another authentication scheme during the negotiation at any time during the negotiation. If an authentication scheme was used and another authentication scheme is selected, the previous authentication scheme may not be selected again in this conversation. The negotiation may eventually terminate when there is no more authentication scheme left from the mutually-supported set. If the server included the CHALLENGE message for an authentication scheme in the initial SSPI token and chooses to select that auth scheme, the server should send an alert message signifying that auth scheme. This is to allow the client to continue the handshake by picking up the initial CHALLENGE message sent in the initial SSPI context token for this authentication scheme.

Block 410 illustrates sending a verify message. Whenever there is a key available for either the client or the server, a VERIFY message is produced and included in the output token.

The authentication schemes managed by the advanced security negotiation package 106 should support RFC3961 by producing a protocol key based on RFC3961. That protocol key is used as the base key in the parlance of RFC3961 to sign the WST messages in the conversation. For per-message tokens such as the output tokens of MakeSignature( ) and EncryptMessage( ), the advanced security negotiation package 106 implements RFC4121.

Advanced security negotiation package 106 offers advantages of maintaining backward compatibility as there are no changes to the messages of RFC4178 and updates to the client and the server make optimistic negotiation possible in minimizing the number of context establishment tokens. The updates to the context are based on information collected from the user. Thus, the backward compatibility and minimal context establishment tokens reduce the costs of protocol negotiation.

Exemplary Processing Functionality for Advanced Security Negotiation

Figure 5:
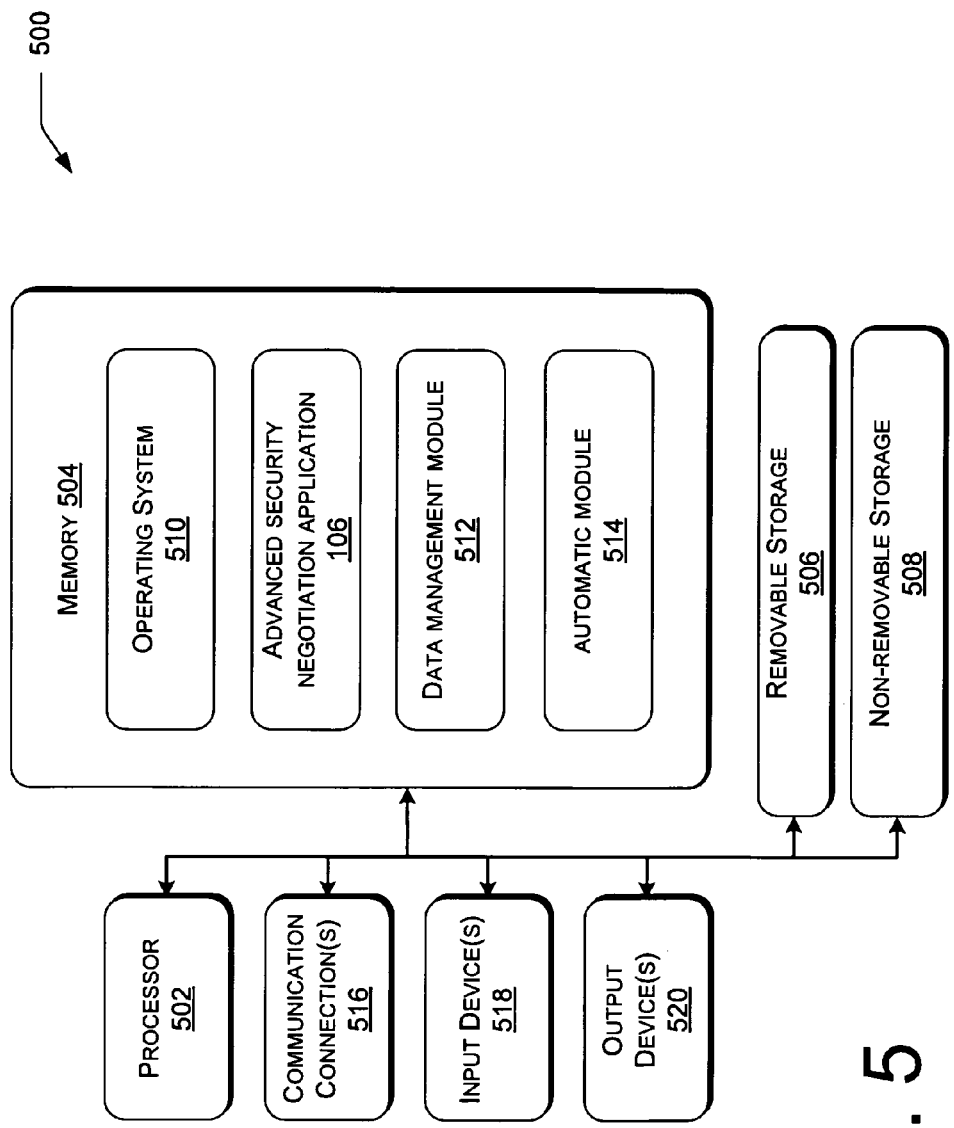
FIG. 5 is a schematic block diagram showing an exemplary system for the advanced security negotiation package according to one implementation.

FIG. 5 illustrates an exemplary processing functionality 500 to create an advanced security negotiation package 106.

The processing functionality 500 may be configured as any suitable computing device or server capable of implementing the advanced security negotiation package 106. In one exemplary configuration, the processing functionality 500 comprises at least one processing unit 502 and memory 504. The processing unit 502 may be implemented as appropriate in hardware, software, firmware, or combinations thereof. Software or firmware implementations of the processing unit 502 may include computer- or machine-executable instructions written in any suitable programming language to perform the various functions described.

Memory 504 may store programs of instructions that are loadable and executable on the processor 502, as well as data generated during the execution of these programs. Depending on the configuration and type of computing device, memory 504 may be volatile (such as RAM) and/or non-volatile (such as ROM, flash memory, etc.). The server may also include additional removable storage 506 and/or non-removable storage 508 including, but not limited to, magnetic storage, optical disks, and/or tape storage. The disk drives and their associated computer-readable media may provide non-volatile storage of computer readable instructions, data structures, program modules, and other data for the computing devices.

Memory 504, removable storage 506, and non-removable storage 508 are all examples of computer storage media. Computer storage media includes volatile and non-volatile, removable and non-removable media implemented in any method or technology for storage of information such as computer readable instructions, data structures, program modules or other data. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the server or other computing device.

Turning to the contents of the memory 504 in more detail, may include an operating system 510, one or more application programs or service for implementing the advanced security negotiation application program 106. In one implementation, the memory 504 includes a manager module 512 and a protocol management module 514. The manager module 512 includes but is not limited to identifying and tracking a session. The protocol management module 514 stores and manages storage of information, such as session identifier, session state, computing devices of the user, and the like, and may communicate with one or more local and/or remote databases or services.

The memory 504 further includes a user interface module 516 and a session module 518. The user interface module 516 presents the user with the user interface to log in or log off, in and out of a session, and the like. The session module 518 includes but is not limited to, tracking a state of the computing devices, logging in or logging off, connecting or disconnecting, and the like. The session module 518 performs connections, disconnections, search functions, such as performing searches to identify the client devices that are logged on, logged off, state of the client devices, the status of the user, and the like.

The memory 504 may include application programming interface (APIs) module 520 and an internal interface module 522. The APIs 520 help support requests for creating the advanced security negotiation package 106, identifying the account to be queried, and an enumerating the account made by the advanced security negotiation application program 106.

The processing functionality 500 may also contain communications connection(s) 524 that allow the processing functionality 500 to communicate with a stored database, another computing device or server, the user terminals, and/or other devices on the network. Communications connection(s) 524 is an example of communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The processing functionality 500 may also include input device(s) 526 such as a keyboard, mouse, pen, voice input device, touch input device, etc., and output device(s) 528, such as a display, speakers, printer, etc. The processing functionality 500 may include a database hosted on the processing functionality 500 including, but is not limited to, session data, network addresses, list of computing devices 104, and the like. All these devices are well known in the art and need not be discussed at length here.

The subject matter described above can be implemented in hardware, or software, or in both hardware and software. Although the subject matter has been described in language specific to structural features and/or methodological acts, it is to be understood that the subject matter defined in the appended claims is not necessarily limited to the specific features or acts described above. Rather, the specific features and acts are disclosed as exemplary forms of implementing the claimed subject matter. For example, the methodological acts need not be performed in the order or combinations described herein, and may be performed in any combination of one or more acts.

The invention claimed is:

1. A method for creating an advanced security negotiation package, implemented at least in part by a computing device, the method comprising:

creating an advanced security negotiation protocol under a Simple and Protected Negotiation Mechanism (SPNEGO) protocol, the advanced security negotiation protocol negotiates an authentication scheme;

defining a message to protect negotiation data during the advanced security negotiation protocol, the message includes a fixed length header and a variable length payload;

generating an initial message including multiple authentication messages to reduce redundant roundtrips alongside a list of supported authentication schemes;

generating a per-message token to allow for a flexible plug-in architecture for each of the multiple authentication messages and if a token fails to generate for one or more of the multiple authentication messages, removing the one or more authentication messages from the list of supported authentication schemes;

sending the initial message with trust roots and certificate verification associated with the computing device, a selection of a first one of the multiple authentication messages based on the trust roots and certificate verification;

receiving a selection of a second one of the multiple authentication messages based on the trust roots and certification, the second one of the multiple authentication messages to replace the first one of the multiple authentication messages; and implementing key exchanges by a mini Security Support Provider (SSP).

2. The method of claim 1, further comprising a client and a server supporting the advanced security negotiation package in order to handle the authentication scheme.

3. The method of claim 1, wherein the advanced security negotiation package is implemented as a Security Support Provider (SSP).

4. The method of claim 1, wherein the advanced security negotiation package comprises being backward compatible with existing Windows Simple Protected Negotiation Mechanism deployments.

5. The method of claim 1, further comprising identifying authentication packages using a Globally Unique Identifier (GUID).

6. The method of claim 1, further comprising establishing a security context by generating a conversation ID, filling a common header, and filling a Random field using a secure random number generator.

7. The method of claim 6, further comprising filling authentication schemes with an available list of supported authentication schemes in a decreasing preference order of a server.

8. The method of claim 1, further comprising examining extensions and rejecting extensions that have unknown extensions.

9. The method of claim 1, further comprising exchanging messages, exchanging keys, selecting an authentication scheme from a list of mutually supported authentication schemes, and replying with a handshake message of a selected authentication scheme.

10. The method of claim 9, further comprising sending authentication meta-data blobs from each Security Support Provider (SSP) together with a list of supported authentication packages in an initial round trip of the advanced security negotiation protocol.

11. One or more computer-readable devices comprising computer-executable instructions that, when executed, perform the method as recited in claim 1.

12. A system for synchronization, the system comprising:
a processor;
a memory coupled to the processor, wherein the processor is configured for:
receiving requests to begin a conversation between a client and a server;
defining an advanced security negotiation protocol under a Simple and Protected Negotiation Mechanism (SPNEGO) protocol, the advanced security negotiation protocol negotiates a first authentication scheme;
selecting the first authentication scheme to utilize as a negotiation package from a plurality of authentication schemes supported by both the client and the server;
using a message type to protect negotiation data during the advanced security negotiation protocol, each message of the message type including a fixed length header and a variable length payload;
sending an initial message that carries multiple authentication messages to reduce redundant roundtrips, each of the multiple authentication messages being of the message type; and
allowing the client or the server to select a second authentication scheme from among the plurality of authentication schemes supported by both the client and the server during negotiation and wherein when the second authentication scheme is selected, preventing the first authentication scheme from being used again in the conversation.

13. The system of claim 12, further comprising automatically updating the advanced security negotiation protocol by updating context that is based on information received from a user.

14. The system of claim 12, wherein protecting negotiation data comprises receiving verification information from a client and a server.

15. The system of claim 12, further comprising minimizing redundant roundtrips by having an initial message carry multiple Authentication Protocol (AP) request messages.

16. The system of claim 12, further comprising identifying the advanced security negotiation protocol as a negotiation protocol of choice to use.

17. A computer-readable storage device comprising computer-readable instructions executed on a computing device, the computer-readable instructions comprising instructions for:
creating an advanced security negotiation package under a Simple and Protected Negotiation Mechanism (SPNEGO) protocol, the advanced security negotiation package negotiates an authentication scheme by using a security protocol;
defining a message to protect negotiation data during the advanced security negotiation protocol;
minimizing redundant roundtrips by having an initial message carry multiple authentication schemes;
sending the initial message with a selection of a first one of the multiple authentication schemes;
receiving a selection of a second one of the multiple authentication schemes, the second one of the multiple authentication schemes to replace the first one of the multiple authentication schemes, and wherein when the second authentication scheme is selected, preventing the first authentication scheme from being used again; and
concatenating a set of meta-data messages as a follow up message to the initial message.

18. The computer-readable storage devices of claim 17, wherein the advanced security negotiation protocol comprises being backward compatible with existing Windows SPNEGO deployments.

19. The computer-readable storage devices of claim 17, further comprising filling authentication schemes with an available list of authentication schemes in a decreasing preference order of a server.

* * * * *